G. H. LEWIS.
WRAPPING MACHINE.
APPLICATION FILED JULY 9, 1918.
1,294,681.
Patented Feb. 18, 1919.
2 SHEETS—SHEET 1.
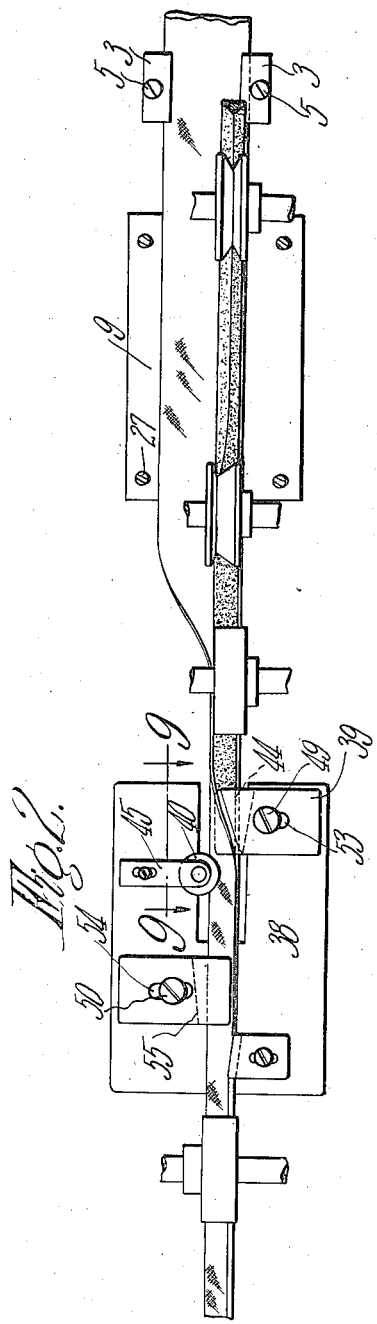
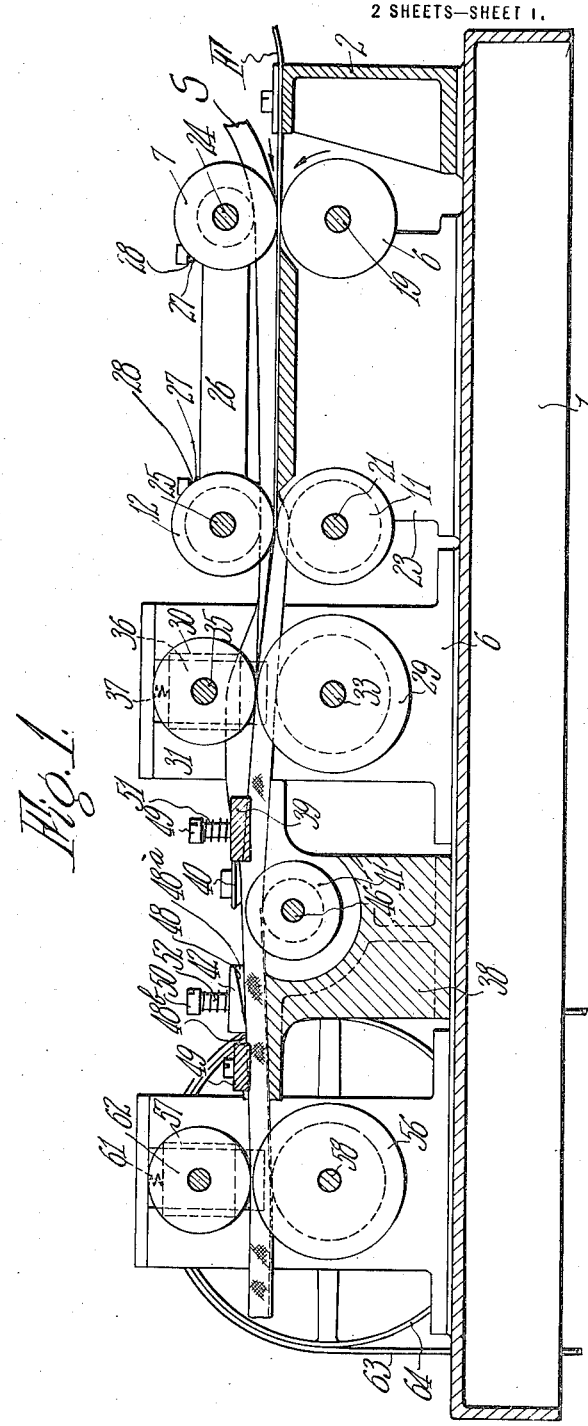
INVENTOR.
George H. Lewis,
BY Chapin + Neal
ATTORNEYS.

G. H. LEWIS.
WRAPPING MACHINE.
APPLICATION FILED JULY 9, 1918.
1,294,681.
Patented Feb. 18, 1919.
2 SHEETS—SHEET 2.
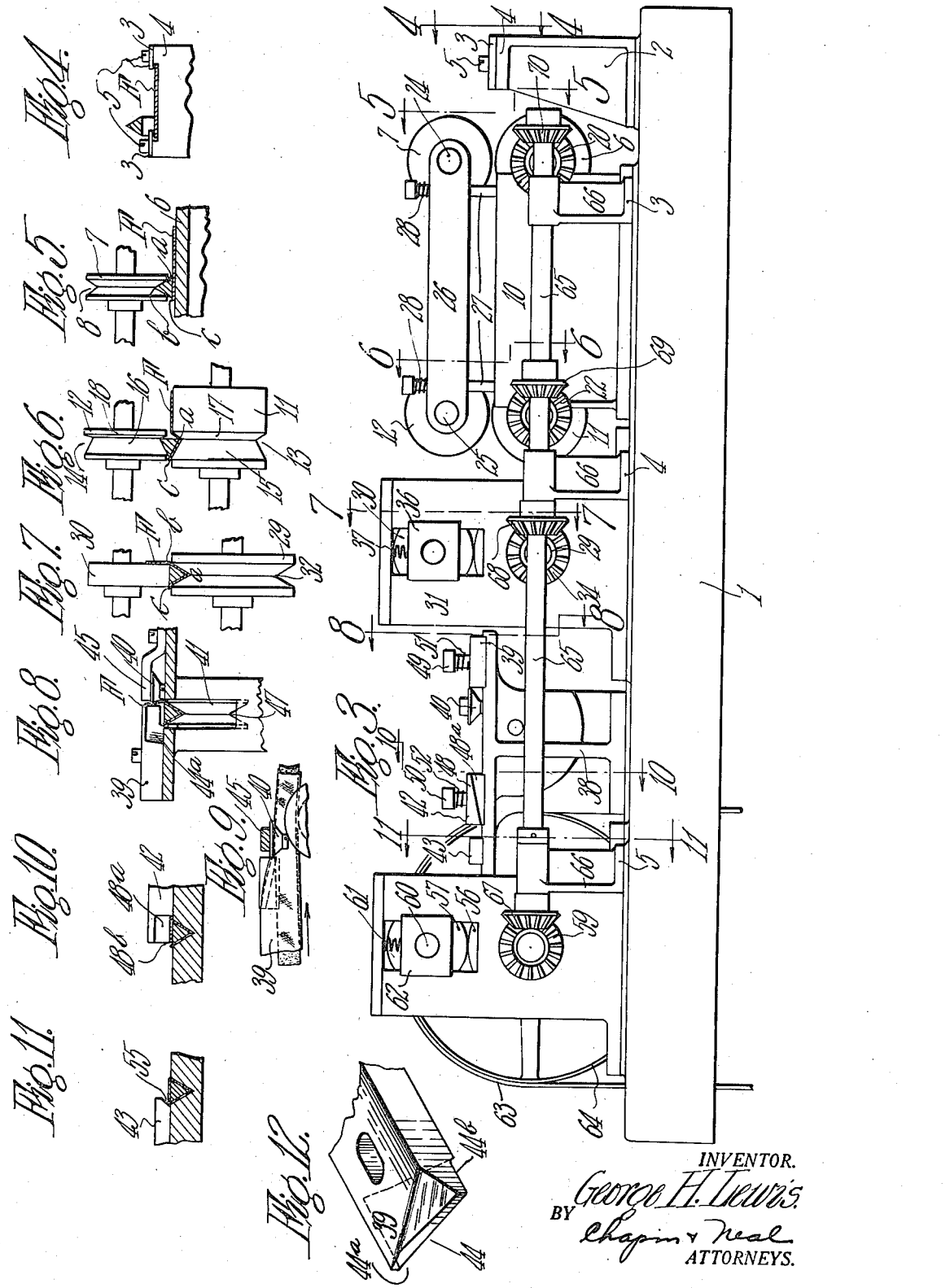
INVENTOR.
George H. Lewis
BY Chapin & Neal
ATTORNEYS.

UNITED STATES PATENT OFFICE.

GEORGE H. LEWIS, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

WRAPPING-MACHINE.

1,294,681. Specification of Letters Patent. Patented Feb. 18, 1919.

Application filed July 9, 1918. Serial No. 244,007.

*To all whom it may concern:*

Be it known that I, GEORGE H. LEWIS, a citizen of the United States of America, residing at Chicopee Falls, in the county of Hampden and State of Massachusetts, have invented certain new and useful Improvements in Wrapping-Machines, of which the following is a specification.

My invention relates to wrapping machines and more particularly to bead wrapping machines for wrapping the fabric covering about beads intended for use, more particularly, in rubber tires.

In the application of the fabric wrapping to the semi-plastic beads of rubber stock used in the manufacture of rubber tires considerable difficulty is experienced in attempting to wrap the fabric quickly and smoothly about the bead stock, particularly when, as is so frequently the case, the bead has an angular form.

An object of my invention is to provide a machine for quickly, smoothly, accurately and continuously wrapping strip fabric about strip material, as beads for rubber tires, with more particular reference to such masses having angular forms, and having edges over which the fabric should be carried smoothly and without wrinkles or other unevennesses.

Other objects and advantages of my invention will appear as this description proceeds, and to the end set forth, and also to improve generally upon devices of the character indicated, my invention consists in the following matters hereinafter described and claimed.

In the accompanying drawings:

Figure 1 is substantially a central longitudinal section through a machine embodying my invention;

Fig. 2 is a top plan view of the machine, the roller supports being omitted;

Fig. 3 is a side elevation of the machine;

Figs. 4 to 8 and 10 and 11 are fragmental views, showing the progress of the bead and fabric through the machine, and taken looking in the direction of the arrows from approximately the points indicated by lines 4—4, 5—5, 6—6, 7—7, 8—8, 10—10, and 11—11 respectively, of Fig. 3, but with the fabric and bead in place in the machine;

Fig. 9 is a fragmental sectional view showing the fabric and bead, taken substantially on the line 9—9 of Fig. 2 looking in the direction of the arrows; and Fig. 12 is a fragmental perspective view of the supporting block.

Without restricting my invention thereto I show and describe it as embodied in a machine for wrapping the fabric covering about a strip of triangular bead of semi-plastic rubber stock such as ultimately forms a component of standard rubber tires for vehicles. Referring now to the drawings:

The various parts of the illustrated machine are carried upon a base 1 and constitute means for rapidly and efficiently wrapping a strip of fabric completely about a strip of bead stock. Proceeding from right to left, as the machine is here illustrated, and in the direction of travel of the materials, the machine presents a guiding table, 2 for the fabric F (Fig. 1) which table has a flat upper surface guarded at its sides by the overhanging retaining guards 3, 3 carried upon the upstanding side guards 4, 4 and conveniently retained thereon by the screws 5, 5. Next adjacent the table 2 is a pair of rolls 6 and 7, the lower roll, 6, being cylindrical in form and with a plain surface, and the upper roll, 7, having a V-shaped circumferential groove 8 therein (Fig. 5). Thus, the two rolls present a species of receptacle for the materials supporting the stock at its sides. Next adjacent the rolls 6 and 7, but spaced therefrom by the wide flat top 9 of the table 10 sufficiently to provide a proper length for the rubber stock to be turned or twisted gradually and properly, is the pair of rolls 11 and 12. As shown in Fig. 6, each of these rolls is provided with a circumferential groove 13 or 14, respectively, which grooves form a species of the receptacle for the materials and are of substantially triangular contour and provide mating, wide, and gradually inclined faces 15 and 16 for the material to lie against, and narrow sharply inclined relief faces 17 and 18.

With this arrangement, the fabric F will lie flat on the roller 6 and the face c—a of the stock S will be pressed into adhering contact with the fabric by the roll 7. When the materials reach the rolls 11 and 12, a partial turning of the stock is compelled and the fabric is further pressed against the fabric, and the fabric is turned smoothly and without puckers or wrinkles about the corner *a*.

Conveniently, the roller 6 is fixed upon a journal 19 rotatably mounted in the table 10, the journal carrying fixed thereon the bevel driving gear 20. As shown, the roller 11 is similarly carried at the other end 23 of the table, being fixed upon a journal 21 carrying fixed thereon the driving gear 22. The rolls 7 and 12 are shown as rotatably mounted by journals 24 and 25 in a frame 26. The frame 26 is vertically movable upon uprights 27 passed therethrough and carried by the table, and springs 28 press the frame, and hence the rolls, toward the coöperating lower rolls; the springs, coupled with the weight of the frame and upper rolls, being arranged to press the upper rolls onto the material with the desired force.

Next adjacent the rolls 11 and 12 is a pair of rolls 29 and 30, carried in the supports 31, 31. As shown more particularly in Fig. 7, the lower roll, 29, presents a substantially V-shaped circumferential groove 32 while the upper roll 30 is merely cylindrical with a plain surface, a species of receptacle for the materials being thus provided. At these rolls the materials are given the twist required to attach the fabric to the second face *a—b* of the stock, the roll 30 packing the materials into the groove 32 with pressure sufficient to cause the fabric to adhere smoothly to the face *a—b* of the stock.

As the parts are here illustrated, the roll 29 is fixed upon a journal 33 rotatably mounted in the supports 31 and carrying fast therewith the bevel driving gear 34. The roll 30 is rotatably mounted by a journal 35 carried at its ends in blocks 36, 36 vertically slidable in the supports 31 and pressed toward the lower roll by springs 37, 37 of a strength to give the desired pressure upon the materials.

Next adjacent the rolls 29 and 30 is a folding-box designated generally as 38 and which includes, in the order in which they act upon the materials, the supporting block 39, the folder wheel 40, the carrying roll 41, the pressing block 42, and the folding and pressing block 43, all conveniently carried by the frame 38.

The block 39 (see Figs. 1, 2, 8, and 9, and more particularly Fig. 12) receives the stock in its passageway 44 (tapered from front to back as indicated at 44$^a$ and 44$^b$) but initially holds the fabric from contact with the side *b—c* of the stock, while permitting the fabric to be gradually folded over toward and onto the stock. To this end of gradually folding, the block has its top face beveled in two directions, that is, the block has its rear corner cut away diagonally so that the fabric can be turned from its vertical position, as shown in Fig. 7, to a horizontal position, but that turning can take place but gradually. To accomplish the turning the folder wheel 40 is provided.

This wheel is rotatable upon a vertical axis, being shown as pivoted to the bar 45. It is conical in form with the smaller end at the bottom. With this arrangement the roller acts to turn the upstanding fabric into a horizontal position and onto the stock. But the action of the roller is, as stated above, controlled and made gradual by the beveled block 39.

The carrying roller 41, upon its journal 46, lies below the materials immediately adjacent the wheel 40 and supports the materials as they pass from the wheel toward the block 42. As illustrated, more particularly in Fig. 8, this roll presents a V-shaped peripheral groove 47 in which the materials lie.

The pressing block 42 which the materials next meet in their progress through the machine, presses the fabric smoothly and gradually into contact with the side *b—c* of the stock. To this end the block has a passage 48 which tapers from front to back, as indicated at 48$^a$ and 48$^b$, the exit 48$^b$ confining the fabric and stock sufficiently closely to press the fabric firmly to the stock.

As shown, the blocks 39 and 42 are held to the frame 38 by screws 49 and 50 screwed into the frame, but presenting plain shanks passing through the blocks. Between each block and the screw head is carried an expanding spring 51, 52, forcing the block downward. In this way the blocks are held in proper position and contact relative to the materials by a yielding pressure which permits the blocks to yield under undue strain. As indicated at 53 and 54, elongated slots in the blocks are provided for the screws thereby to provide for accurate adjustment and placing of blocks. The connection of the bar 45 (which carries the wheel 40) to the frame 39 is preferably of a character similar to that just described.

Next in order is the folding-and-pressing block 43. This has for its purpose the folding and pressing of the remaining narrow edge of the fabric, as shown in Fig. 11, and to this end has its edge 55 under-cut slightly as indicated in Fig. 11 and also has this edge slanted toward the materials in the direction of their travel as shown in Fig. 2. Thus, as the materials travel past the said edge, the remaining portion of the fabric is pressed into contact with the stock.

Finally, at the discharge end of the machine are the rollers 56 and 57, for giving a final packing, pressing, and smoothing to the materials. These rolls in the present embodiment are like the rolls 29 and 30, so that Fig. 7 may be taken as a view of them also, and they are similarly mounted, the roller 56 fast upon the rotatable shaft 58 fast carrying the driving bevel gear 59, and the roller 57 having its journal 60 carried in vertically slidable and spring (61, 61) pressed boxes 62, 62.

The rollers 6, 11, 29, and 56 are conveniently driven by a belt 63 driving the pulley 64 carried fast upon the journal 58, the driving connection to the rolls 6, 11, and 29 being conveniently effected by the shaft 65 supported in the uprights 66, 66, 66 and carrying fast therewith the bevel gears 67, 68, 69, and 70 meshing with the gears carried by the journals of the rolls. The driven lower rolls are, of course, rotated counter-clockwise, as the machine is shown in Fig. 3, to carry the materials through the machine.

To briefly review the operation of the machine:—The fabric F is flattened and guided to the first rolls 6 and 7 of the machine by the guiding table 2, the stock S at the same time being fed to the rolls (Fig. 1). Next, the materials are passed between the rolls 6 and 7 (Fig. 5) and the bottom side c—a of the stock pressed into intimate contact with the fabric. Next, the materials pass to the rolls 11 and 12 where the stock is partially turned over, (Fig. 6) there being a quite material distance between the two sets of rolls, and the fabric lying for a considerable distance (Fig. 2) flat upon the flat top 9 of the table 10, such top being sufficiently wide to support the fabric fully across the width of the fabric. Thus the materials are started to turn over very gradually and accurately and all danger of wrinkles and so forth at this stage is avoided.

Next, the materials pass to the rolls 29 and 30 where the turn or twist is completed (Fig. 7) and the fabric is applied to the side a—b. Next the materials pass to the folding box 38 (Figs. 8 and 12) where the fabric is applied to the final side b—c of the stock. The action here is finely controlled by the beveled supporting block 39 which prevents the action of the folder wheel 40 from turning the final side of the fabric down too sharply and compels the fabric to gradually and smoothly pass from the vertical position (Fig. 7) (to which it is pulled by the action of the folder wheel) to the horizontal position. Next, after the fabric has been smoothly laid by the folder wheel, with its action controlled by the block 39, the fabric is pressed to the stock by the blocks 42 and 43 (Figs. 10 and 11). Next and finally, the materials pass to the rolls 56 and 57 where a final pressing and shaping is given. As a result of these various steps, the bead leaves the machine completely wrapped in the fabric, the fabric being laid on smoothly and without wrinkles or puckers.

Also, since the fabric (which supports the the bead) is well supported throughout its travel through the machine, as by the various tables and rolls, it will be seen that the machine is well adapted to the handling of semi-plastic stock. But this particular advantage and adaptation does not, of course, interfere with the use of the machine for the handling of goods of very considerable tensile strength, as fully vulcanized beads, and, the machine is well adapted to that purpose also.

Although I have disclosed my invention as embodied in a machine for wrapping triangular beads, as of course that is the usual form of angular bead, it will be understood that my invention is not confined to machines for wrapping triangular beads merely, as by properly shaping the grooves in the rolls and providing a sufficient number of rolls and of folding boxes the wrapping of various other shapes of angular beads can be successfully carried out.

It will be seen that I have provided a machine for quickly, smoothly, accurately and continuously wrapping strip fabric about strip material, as beads for rubber tires, more particularly with reference to such strips having an angular form and having edges over which the fabric should be carried smoothly and without wrinkles or other unevennesses.

What I claim is:

1. In a machine for wrapping strip covering about strip stock having a plurality of sides, in combination, means for causing the progress of the materials, and, in order of the progress, means for applying the covering to a side of the stock and means for twisting the stock and applying another side of the stock to the covering; substantially as described.

2. In a machine for wrapping strip covering about strip stock having a plurality of sides, in combination, means for causing the progress of the materials, and, in order of progress, means for receiving the materials and applying the covering to a side of the stock, means for imparting a partial twist to the stock, such partial twist being insufficient to carry another side of the stock into contact with the covering, and means for completing the twist initiated by the first named twisting means thereby to carry said another side of the stock into contact with the covering and apply such side to the covering; said first named twisting means serving to compel the twisting of said stock, brought about by said first named and said second named twisting means, to take place gradually; substantially as described.

3. In a machine for wrapping strip covering about strip stock having a plurality of sides, in combination, means for causing the progress of the materials, and, in order of the progress, elements presenting a receptacle confining the stock at the sides thereof and also confining a portion of the width of the strip of covering, with a side of said stock in contact with said portion, elements presenting another receptacle for confining the stock at its sides and confining another portion of the width of said covering, such receptacle being so located with respect to the first-named receptacle that the strip of stock is compelled to longitudinally twist in passing from the first receptacle to the second, whereby the second side of the stock is applied to the second-named portion of the covering by partially rotating the stock about a longitudinal axis to carry its second side toward such second named portion of the covering; substantially as described.

4. In a machine for wrapping strip covering about strip stock having a plurality of sides, in combination, means for causing the progress of the materials, and, in order of progress, a pair of pressing rolls for receiving the materials between them, the one having a flat surface for supporting the covering flat and the other having a groove contoured to receive and confine the stock therein without tending to twist the same, and a second pair of rolls for receiving the materials between them each having an angular groove, the two grooves being mated to receive and confine the materials and to provide a receptacle therefor, such receptacle being so located with respect to the groove in the grooved roller of the first said pair that the strip of stock is compelled to longitudinally twist in passing from the first pair of rollers to the second, whereby the second side of the stock is applied to the covering by partially rotating the stock about its longitudinal axis to carry its second side toward the covering; substantially as described.

GEORGE H. LEWIS.